United States Patent Office 3,297,608
Patented Jan. 10, 1967

3,297,608
METHOD FOR CURING EPOXY RESINS
UNDER WATER
Allen Noshay, East Brunswick, and George J. Barenholtz, Elizabeth, N.J., assignors to Esso Research and Engineering Company, a corporation of Delaware
No Drawing. Filed May 31, 1963, Ser. No. 284,387
4 Claims. (Cl. 260—23.7)

This invention relates to a method for curing epoxy resins and more particularly relates to a method for curing these resins under water.

It is known to cure epoxy resins using polyamines or polyamides as curing aids. It is also known to cure mixtures of epoxy resins and oxidized liquid polymers or copolymers of conjugated diolefins using the same curing aids. All of these cures take place at or near room temperature, although they may be baked for 30 to 60 minutes at 200 to 400° F.

It has also been proposed to carry out these low temperature cures of epoxy resins and mixtures of epoxy resins and conjugated diolefin polymers under water, for example, in bonding concrete bricks under water. Unfortunately, however, no cure is obtained under water because of the solubility of the polyamine and polyamide curing aids in the water.

In accordance with this invention it has now been discovered that this difficulty can be overcome and strong cures of epoxy resins and resin-oxidized-diolefin polymer mixtures obtained provided that an adduct of the amine or amide curing aid with the oxidized product of a conjugated diolefin polymer or copolymer is used as the curing aid.

The polymers to which the present invention are applicable are the liquid polymers of conjugated diolefins of four to six carbon atoms such as butadiene, isoprene, dimethyl butadiene, piperylene, methyl pentadiene, etc. These conjugated diolefins may be polymerized alone or together with minor amounts of ethylenically unsaturated monomers copolymerizable therewith, e.g., 15 to 25 wt. percent of styrene or other vinyl aromatic hydrocarbon. Such polymers may be prepared by mass polymerization either in the presence of a hydrocarbon soluble peroxide catalyst as described by the Arundale Patent No. 2,586,594, or in the presence of metallic sodium as described by the Gleason Patent No. 2,762,851, and the Moise Patent No. 2,791,618. The disclosure of these patents are included herein by reference.

The oxidation, by air blowing, of the liquid polymers produced by the above processes is best carried out in a hydrocarbon solvent of moderate to good solvency, e.g., solvents or solvent mixtures having a Kauri-butanol value of at least 40. Such a solvent is particularly beneficial in permitting high oxygen contents to be secured without encountering the instability which induces gelation of the mass being treated. Examples of suitable solvents include aromatic or mixture of aromatic and aliphatic hydrocarbons boiling up to 250° C., e.g., benzene, toluene, hemimellitene, pseudocumene, mesitylene, propyl benzene, cymene, ethyl toluene, methyl ethyl benzene, xylenes, Solvesso 100 (a mixture of aromatic hydrocarbons boiling from about 150 to 175° C.), Solvesso 150 (a mixture of aromatic hydrocarbons boiling 190 to 210° C.) and straight-run mineral spirits boiling in the range of 140 to 205° C. Catalysts suitable for the oxidation include organic salts of metals such as the naphthenates, octoates, and other hydrocarbon soluble metal salts of cobalt, lead, iron and manganese. These catalysts are used in amounts ranging from 0.001% to 1.0% by weight.

The amount of oxygen in the product will vary according to the conditions of oxidation, but for the purposes of this invention it will vary between about 8 and 20%. The oxidized product is light to deep amber in color depending upon the amount of oxygen present.

The oxidized polymers may also be prepared by epoxidation via the well known peracid technique. According to this process, the polymers may be epoxidized by any organic peroxide but the lower aliphatic peracids, such as peracetic acid or performic acid are preferred. The oxidation reaction may be carried out using a preformed peracid or the peracid may be formed from its constituents during the oxidation reaction and in the reaction medium. Stoichiometric amounts of peracid may be used or amounts below that theoretically required to completely oxidize the double bonds present in the polymer (see, for example, U.S. Patents Nos. 2,826,556, 2,829,130, 2,829,131, 2,829,135, 2,921,921.)

In accordance with the present invention, adducts which have reduced water solubility are prepared from an oxidized polymer containing about 8 to 20% oxygen and the amine or amide curing aids and are used as curing aids for curing epoxy resins, both above and under water.

The amine curing agents may be aliphatic compounds containing a plurality of amine groups, including monomeric $C_2$ to $C_{12}$ aliphatic compounds containing from 2 to 6 amine groups per molecule. Examples of such preferred compounds are ethylene diamine, diethylene-triamine, triethylene-tetramine, tetraethylene-pentamine, and diethylamino-propylamine.

The amides suitable as curing agents for this invention consist of the condensation products of the polyamines above described with dimerized or trimerized $C_8$ to $C_{24}$ unsaturated carboxylic acids, for instance linoleic acid or unsaturated vegetable oils. The compounds so formed generally have a molecular weight within the range of 500 to 1500 and a viscosity of from 50 to 1000 poises at 25° C.

Adducts of the oxidized polymer and amine or amide curing agents are prepared by adding the oxidized polymer to a stoichiometric excess of the amine or amide curing agents at room temperature and allowing the mixture to stand for several hours at room temperature or at a temperature up to 100° C. for a period of time decreasing to 30 minutes at 100° C. The adduct is then ready for use at once or it can be stored and used at a later time. It is viscosity stable and does not gel. From 5 to 160 parts of the adduct per 100 parts of the epoxy resin may be used.

The advantages to be secured from the invention are hereinafter described in the following examples which are presented to illustrate the effects of the present invention. All quantities are expressed in this specification and claims on a weight basis unless otherwise specified.

*Example 1*

A butadiene-styrene drying oil was prepared from the following charge:

| | Parts |
|---|---|
| Butadiene-1,3 | 75 |
| Styrene | 25 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 Kauri-butanol value (reference scale: Benzene 100 K.-B. value, n-heptane 25.4 K.-B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poises at 50% NVM in Varsol solution and the nonvolatile portion thereof had an average molecular weight of about 3,000.

The polymeric drying oil was dissolved in Solvesso 150 (high percentage of aromatics with an API gravity of 30.2, a flash point of 118° C., and a boiling range of 322° to 351° F.) to make a 35% NVM solution. It was then blown with air at about 230° F. until the oxygen content in the structure reached 16%.

To 100 parts of the oxidized polymer there were added various proportions of tetraethylene pentamine (TEPA) and the mixture allowed to stand for from 3 to 500 hours at room temperature to form the adduct. The following table shows that the adduct is viscosity stable since no substantial change in viscosity occurs even after 500 hours.

TABLE I

| Parts Oxidized | Parts, TEPA | Room Temperature Viscosity-Poise | | | | | | | |
|---|---|---|---|---|---|---|---|---|---|
| | | 3 Hrs. | 27 Hrs. | 66 Hrs. | 125 Hrs. | 225 Hrs. | 240 Hrs. | 385 Hrs. | 500 Hrs. |
| A. 100 | 0 | | | 5.8 | 5.9 | 5.9 | | 5.8 | |
| B. 100 | 30 | 23 | 35 | | 41 | 43 | | 44 | |
| C. 100 | 50 | 10 | | 12.9 | 14.8 | | 12.9 | | 14.0 |
| D. 100 | 100 | | | 4.3 | | | 4.7 | | 4.7 |

*Example 2*

Adduct C from Example 1 was mixed with 8 parts of an epoxy resin known as Epon 828 (low molecular weight condensation product of epichlorohydrin and p,p'-isopropylidene-diphenol having the formula

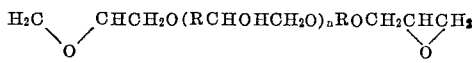

where R is $C_6H_4(CH_3)_2C_6H_4$, and having a viscosity at 25° C. of 100–160 and an epoxide equivalent of 180–195) and the mixture cured at room temperature both in the air and under water. The following data were obtained.

TABLE II

| Parts Adduct | Parts Epon 828 | Type Polymet Former | |
|---|---|---|---|
| | | Air Curing | Underwater Curing |
| 8 | 8 | Hard, slightly flexible | Hard, some leaching of amine. |
| 7 | 8 | Hard, slightly flexible | Hard, no leaching. |
| 6 | 8 | Hard, inflexible | Hard, no leaching. |
| 5 | 8 | Hard, inflexible (waxy) | Hard, no leaching. |
| 4 | 8 | Hard, inflexible | Hard, brittle. |
| 3 | 8 | Soft, flexible | Hard, brittle. |
| 2 | 8 | Tacky, tears easily | Soft, rubbery. |

*Example 3*

Sand-filled blends were prepared from mixtures of Epon resin and the adduct of Example 1 and of non-adducted mixtures of Epon resin, oxidized polymer oil of Example 1 and TEPA. These blends were used to bond concrete under water. For this purpose, concrete dumbbells were prepared (according to ASTM #C190–59), sawed in half, and bonded under water with the above-mentioned blends. The cured bonds were then broken on a Rheile' Tensile Tester to obtain the tensile strengths of the bonds. The results, given below, show that the adduct is superior in tensile strength to the three component oxidized polymer-Epon-TEPA mixture.

TABLE III

| Blend Composition (parts by wt.) | Non-adducted, Three Component Systems | | Adduct [3] System |
|---|---|---|---|
| | A [1] | B [2] | |
| Epon | 8 | 8 | 8 |
| Oxidized polymer | 2 | 2 | 2.7 |
| TEPA | 0.9 | 1.0 | 1.3 |
| Sand (Ottawa) | 15 | 30 | 35 |
| Tensile Strength (p.s.i.) | 100 | 105 | 305 |

[1] 35 min. elasped between preparation of blend and immersion.
[2] 60 min. elasped between preparation of blend and immersion.
[3] 30 min. elasped between preparation of blend and immersion.

*Example 4*

300 g. of a polybutadiene, viscosity 1500 cp. at 100° F., were dissolved in 300 g. of toluene. To this solution were added 57.3 g. of glacial acetic acid and 50.8 g. of a sulfonic acid type cation exchange resin. The mixture was heated to 60° C. and maintained at this temperature. Then 145.8 g. of hydrogen peroxide (50%) were added over a period of 1 and 1¼ hours to produce peracetic acid. This amount of hydrogen peroxide corresponds to about 50% of the stoichiometric amount required fully to oxidize the polybutadiene. After an additional 1½ hours at 60° C., the reaction was complete and the oxidized polybutadiene recovered by vacuum drying after washing with water and then with an aqueous solution of potassium hydroxide. The resulting product was analyzed and found to contain 6.63% oxirane oxygen, which was determined by an analytical procedure corresponding essentially to that of Swern et al., described in Analytical Chemistry, 19:404 (1947).

To 100 parts by weight of this product were then added 55 parts by weight of diethylene triamine and the adduct prepared at room temperature as in Example 1. 50 parts of this adduct were then added to 100 parts of Epon 828 resin and one portion cured at room temperature under water and another portion above water as in Example 2. Excellent cures were obtained in each case.

Example 5

An adduct is prepared at room temperature from 40 parts of the oxidized polymer of Example 1 and 100 parts of a condensation product of polymerized dilinoleic acid and ethylene diamine known as Versamide 125 prepared in accordance with the teachings of U.S. Patent No. 2,379,413 and having the following properties:

| | |
|---|---|
| Viscosity, poises, 25° C. | 450–550 |
| Viscosity, poises, 40° C. | 80–120 |
| Wt. percent ash | 0.05 |
| Sp. gravity 25° C./25° C. | 0.97 |
| Pounds per gallon, 25° C. | 8.1 |
| Softening pt. ° C. (ASTM E–29, modified) | Fluid |
| Flash point ° C. (ASTM D–29) | 265 |
| Amine value | 290–320 |

Excellent underwater and above water cures are obtained when 60 parts of this adduct are added to 100 parts of Epon 828 resin. Similar results are obtained when the epoxidized polymer of Example 4 is used instead of the oxidized polymer of Example 1.

Example 6

Example 1 was repeated with the exception that the air blowing was discontinued when the oxygen content reached 10% instead of allowing it to build up to 16%. Good viscosity stability is realized when the air blown polymer is mixed with the TEPA and allowed to stand for several hours as in Example 1.

Example 7

100 parts of the oxidized polymer made according to Example 6 is mixed with 30 parts of TEPA to form the adduct. 8 parts of this mixture plus 8 parts of Epon 828 results in compound which cures to hard flexible resin in air or under water.

The nature of the present invention having been thus fully set forth and specific examples of the same given what is claimed as new and useful and desired to be secured by Letters Patent is:

1. A method for curing condensation products of epichlorohydrin and p,p'-isopropylidenediphenol which comprises adding 5 to 160 parts by weight of the adduct prepared by condensing (A) 100 parts by weight of an oxidized liquid polymer of a $C_4$ to $C_6$ conjugated diolefin, said polymer being chosen from the group consisting of liquid air blown polymers and liquid epoxidized polymers containing from 8 to 20 weight percent oxygen with (B) a curing aid chosen from the group consisting of
    (a) a $C_2$ to $C_{12}$ aliphatic amine containing 2 to 6 amine groups per molecule, and
    (b) the condensation product of (a) with dimerized $C_8$ to $C_{24}$ unsaturated carboxylic acid and
    (c) the condensation product of (a) with trimerized $C_8$ to $C_{24}$ unsaturated carboxylic acid and said adduct having a molecular weight within the range of 500 and 1500 and a viscosity of 50 to 1000 poises at 25° C. to 100 parts by weight of said condensation product and allowing the mixture to stand under water for several hours at room temperature.

2. A method for curing condensation products of epichlorohydrin and p,p'-isopropylidenediphenol which comprises adding 25 to 100 parts by weight of the adduct prepared by condensing 50 parts by weight of tetramethylene pentamine with 100 parts by weight of an air blown liquid copolymer of 80 parts by weight of butadiene-1,3 and 20 parts of styrene containing 8 to 20 weight percent of oxygen, said adduct having a molecular weigth within the range of 500 and 1500 and a viscosity of 50 to 1000 poises at 25° C. to 100 parts by weight of said condensation product and allowing the mixture to stand under water for several hours at room temperature.

3. A method for curing condensation products of epichlorohydrin and p,p'-isopropylidenediphenol which comprises adding 5 to 160 parts by weight of the adduct prepared by condensing 50 parts by weight of tetraethylene pentamine with 100 parts by weight of an epoxidized liquid polymer of butadiene-1,3 containing 8 to 20 wt. percent of oxygen, said adduct having a molecular weight within the range of 500 and 1500 and a viscosity of 50 to 1000 poises at 25° C. to 100 parts by weight of said condensation product and allowing the mixture to stand under water for several hours at room temperature.

4. A method for curing condensation products of epichlorohydrin and p,p'-isopropylidenediphenol which comprises adding 5 to 160 parts by weight of the adduct prepared by condensing 50 parts by weight of the condensation product of ethylene diamine and dilinoleic acid and 100 parts by weight of a liquid air blown copolymer of 80 parts by weight of butadiene-1,3 and 20 parts of styrene containing 8 to 20 weight percent of oxygen, said adduct having a molecular weight within the range of 500 and 1500 and a viscosity of 50 to 1000 poises at 25° C. to 100 parts by weight of said condensation product and allowing the mixture to stand under water for several hours at room temperature.

References Cited by the Examiner

UNITED STATES PATENTS

| | | | |
|---|---|---|---|
| 2,826,556 | 3/1958 | Greenspan et al. | 260—47 X |
| 3,018,258 | 1/1962 | Meier et al. | 260—47 X |
| 3,029,286 | 4/1962 | Bressler et al. | 260—47 X |
| 3,042,661 | 7/1962 | Kirschenbaum et al. | 260—94.7 X |
| 3,077,461 | 2/1963 | Hood et al. | 260—47 X |

FOREIGN PATENTS

| | | |
|---|---|---|
| 691,543 | 5/1953 | Great Britain. |
| 790,083 | 2/1958 | Great Britain. |

LEON J. BERCOVITZ, *Primary Examiner.*

C. W. IVY, *Assistant Examiner.*